US006565239B2

(12) United States Patent
Rizkin et al.

(10) Patent No.: US 6,565,239 B2
(45) Date of Patent: May 20, 2003

(54) FLUSH LUMINAIRE WITH OPTICAL ELEMENT FOR ANGULAR INTENSITY REDISTRIBUTION

(75) Inventors: Alexander Rizkin, Redondo Beach, CA (US); Il'ya Agurok, Huntington Beach, CA (US); Robert H. Tudhope, Rancho Palos Verdes, CA (US)

(73) Assignee: Farlight, L.L.C., Wilmington, CA (US)

( * ) Notice: Subject to any disclaimer, the term of this patent is extended or adjusted under 35 U.S.C. 154(b) by 7 days.

(21) Appl. No.: 09/794,797

(22) Filed: Feb. 27, 2001

(65) Prior Publication Data

US 2002/0159265 A1 Oct. 31, 2002

(51) Int. Cl.[7] .................................................. B60Q 1/06
(52) U.S. Cl. ..................... 362/373; 362/153; 362/153.1; 362/330; 362/339; 362/332; 362/340
(58) Field of Search .................................. 362/373, 145, 362/153, 153.1, 147, 148, 364, 339, 330, 326, 294, 332, 340

(56) References Cited

U.S. PATENT DOCUMENTS

| 4,382,274 A | * | 5/1983 | De Backer et al. ..... 340/815.76 |
| 4,994,786 A | | 2/1991 | Schaffer |
| 5,014,167 A | | 5/1991 | Roberts |
| 5,426,414 A | | 6/1995 | Flatin et al. |
| 5,436,741 A | | 7/1995 | Crandall |
| 5,556,189 A | * | 9/1996 | Wallis ..................... 362/153.1 |
| 5,564,820 A | | 10/1996 | Entrop et al. |
| 5,619,182 A | | 4/1997 | Robb |
| 5,669,691 A | | 9/1997 | Barrow |
| 5,731,755 A | | 3/1998 | Boxer |
| D394,833 S | | 6/1998 | Muth |
| 5,774,283 A | | 6/1998 | Nagel et al. |
| 5,788,357 A | | 8/1998 | Muth et al. |
| 5,803,579 A | * | 9/1998 | Turnbull et al. ............ 362/230 |
| 5,938,320 A | | 8/1999 | Crandall |
| 6,005,724 A | | 12/1999 | Todd |
| 6,055,814 A | | 5/2000 | Song |
| 6,056,416 A | | 5/2000 | Ngai et al. |
| 6,086,229 A | | 7/2000 | Pastrick |
| 6,367,949 B1 | * | 4/2002 | Pederson ..................... 362/240 |

* cited by examiner

Primary Examiner—Sandra O'Shea
Assistant Examiner—Bertrand Zeade
(74) Attorney, Agent, or Firm—Lisa A. Brzycki; Gehrke & Associates, S.C.

(57) ABSTRACT

A luminaire flush with a horizontal surface and comprising a housing, an optical window, a light source, and an optical element. The housing has an internal cavity disposed beneath the horizontal surface and defines an opening disposed adjacent the horizontal surface. The optical window, substantially flat and transparent, has a surface that overlays the housing opening. The light source, disposed within the housing cavity, provides a spatial light distribution pattern which defines an optical axis that is disposed substantially perpendicular relative to the optical window surface. The optical element, also disposed within the housing cavity, redistributes light rays emitted by the light source along preselected angles relative to the horizontal surface.

23 Claims, 7 Drawing Sheets

FLUSH LUMINAIRE WITH OPTICAL ELEMENT FOR ANGULAR INTENSITY REDISTRIBUTION

TECHNICAL FIELD

The present invention, in general, is directed to inset luminaires adapted to provide a substantially uniform distribution of light along a low vertical angle. The present invention, more particularly, is directed to flush luminaires capable of being mounted in pavement, and configured to provide a generally low angle of visibility of substantially uniform light, in such applications as airfield runway and taxi-way lights as well as pedestrian crosswalk lights and the like.

BACKGROUND OF THE INVENTION

Inset and recessed lights are known in the art for use in a variety of applications, spanning from high-end technical applications, such as runway centerline airport lights, to specialized design or architectural and other decorative lighting applications. There are, in general, two categories of such lights. One category, flush, has no elevation above the surface. Another category, semiflush, has only minimal elevation above the surface.

A conventional luminaire consists of a housing that is recessed or flush relative to the surface, a light source, and an optical element which directs light in a desired manner. In many such luminaires, a commercially available tungsten-halogen or similar lamp with a reflector is often used as a light source. Such a lamp is able to provide light distribution which may be characterized by a high concentration of luminous flux along the optical axis and in relatively small solid angles, e.g. 10° to 200°, relative to the optical axis, i.e., the so-called "main beam" of the conventional lamp. The optical element, in general, is frequently used to redirect the luminous flux generated by the lamp. There are presently two principal designs of optical elements in use. One such design (e.g., U.S. Pat. No. 5,669,691) uses a prism whenever it is desirable to direct light along a somewhat restricted horizontal angle, usually not exceeding 30° to 40°, above a reference surface. Still another conventional design (U.S. Pat. No. 5,556,189) uses a combination of lenses, e.g., cylindrical and spherical, whenever it is desirable to provide a substantially omnidirectional light distribution, in a horizontal plane above the surface.

One disadvantage of such conventional construction is that most of the generated light is not able to be directed in low horizontal angles, for the reason that neither design is configured to change the light distribution. Another disadvantage relates to physical limitations of shape and dimensions of lenses, making flush omnidirectional luminaires impractical, especially whenever a low vertical angle light distribution pattern is desired. A further disadvantage of such conventional construction is low efficiency, as much of the luminous flux generated by the light source becomes lost or vignetted (i.e., shaded) by the luminaire components and is not emitted outward in the light pattern desired.

OBJECTS AND SUMMARY OF THE INVENTION

One object of the present invention is to provide a flush luminaire having a predetermined distribution of light in the horizontal plane.

Another object of the present invention is to provide a flush luminaire having an omnidirectional distribution of light in the horizontal plane.

Yet another object is to provide a flush luminaire having a high intensity output, especially in low vertical angles.

Yet another object is to provide a flush luminaire with higher efficiency than is currently available.

A further object is to provide such a luminaire of universal design, and which is suitable for such applications as architectural and decorative lights, airport and heliport lights, traffic and pedestrian lights, and the like.

Still another object is to provide such a luminaire, simpler to install and less expensive to manufacture than presently available.

To accomplish the above objects as well as other objects, features and advantages of the invention, the flush luminaire is configured to provide a predetermined (directional or omnidirectional) distribution of light about a substantially horizontal surface. The term "omnidirectional" as used throughout this patent specification shall be understood to mean "being in or involving all directions in the horizontal plane," in contrast to the term "directional," which shall be understood to mean "being in or involving a limited angle in the horizontal plane."

The flush luminaire of the present invention comprises a housing, an optical window, a light source, and an optical element. The housing has an internal cavity disposed beneath the horizontal surface and defines an opening disposed adjacent the horizontal surface. The optical window, preferably transparent and substantially flat, has a surface that overlays the housing opening. The light source, which is disposed within the housing cavity, provides a spatial light distribution pattern which defines an optical axis that is disposed substantially perpendicular relative to the optical window surface. The optical element, also disposed within the housing cavity, redistributes light rays emitted by the light source along preselected angles relative to the horizontal surface, directionally or omnidirectionally.

Further in this regard, one embodiment of the invention directs light beams omnidirectionally about a vertical axis disposed perpendicular relative to the horizontal surface, wherein the light beams are disposed above the horizontal surface. In another embodiment, the light beams are disposed substantially parallel to the horizontal surface.

In reference to the flush embodiment of the present invention, the flat transparent optical window is preferably disposed substantially parallel to the horizontal surface. In that regard, one particularly preferred embodiment of the light source is a light-emitting diode; and a preferred embodiment of the optical element is a prismatic structure.

In general, light-emitting diodes (LEDs) are known to generate heat; and LED longevity is thus dependent upon the removal of such LED-generated heat. As a result, the flush luminaire of the invention further preferably includes an effective amount of heat-transfer surface, so disposed adjacent the light-emitting diode (LED) as to be in a heat-transfer relationship with the LED, to provide removal of any such LED-generated heat, for providing desired longevity of the LED or other heat-generating light source.

Further in that regard, LED performance is known to be temperature dependent, principally because of semiconductor components associated with the light-emitting diode. Accordingly, the LED-generated heat is effectively removed, and the resulting ambient temperature effectively controlled, by a conventional temperature-control device that is configured and so dimensioned as to be disposed preferably within the housing cavity adjacent the light source and in association with the heat-transfer surface, which results in a substantially uniform preselected temperature profile being achieved for the light-emitting diode as well as for any other heat-generating light source that is selected.

In another preferred embodiment of the present invention, the optical element comprises a prismatic light transformer (PLT) which is disposed between the light source and the optical window and that is configured to provide optimal light output relative to the horizontal surface in response to light from the light-emitting diode. In still another preferred embodiment of the invention, the optical element comprises prismatic structure that is integrally formed on the optical window surface.

Still in another preferred embodiment of the present invention is a prismatic light transformer designed as a circular prismatic light transformer (CPLT), which is configured to provide omnidirectional light output relative to horizontal surface.

In yet another embodiment of the flush luminaire of the present invention, the light source comprises a plurality of light sources each of which produces a single light beam, and the plural light beams are integrated such that every light beam is offset from the horizontal surface by substantially the same angle relative to every other light beam.

In a further embodiment of the flush luminaire of the present invention, the spatial light distribution pattern has a substantially circular maximum that is substantially centered on the optical axis. In yet another embodiment of the luminaire of the invention, the spatial light distribution pattern presents a substantially circular maximum light intensity envelope that is offset from the optical axis. In a farther embodiment of the present invention, the flush luminaire includes an especially designed mechanism for providing controlled distribution of light relative to the vertical axis.

The flush luminaire of the present invention further comprises a power supply disposed within the housing cavity. In one embodiment of the present invention, the power supply comprises batteries. In another embodiment of the invention, the power supply is operably connected to an external power source. External power sources that are suitable for purposes of the present invention include, in general, commercial power lines and, in particular, a generator (e.g., diesel or gasoline powered), for the purpose of providing power during emergency situations when commercial power is interrupted or otherwise not available.

These and other features and advantages of the invention will be apparent to those skilled in the art, after referring to the following description and accompanying drawings.

BRIEF DESCRIPTION OF THE DRAWINGS

A clear understanding of the various advantages and features of the present invention, as well as the construction and operation of conventional components and mechanisms associated with the present invention, will become more readily apparent by referring to the exemplary, and therefore non-limiting, embodiments illustrated in the following drawings which accompany and form a part of this patent specification.

Throughout the drawings, like reference numerals refer to like parts.

DETAILED DESCRIPTION OF PREFERRED EMBODIMENTS

Figure 1:
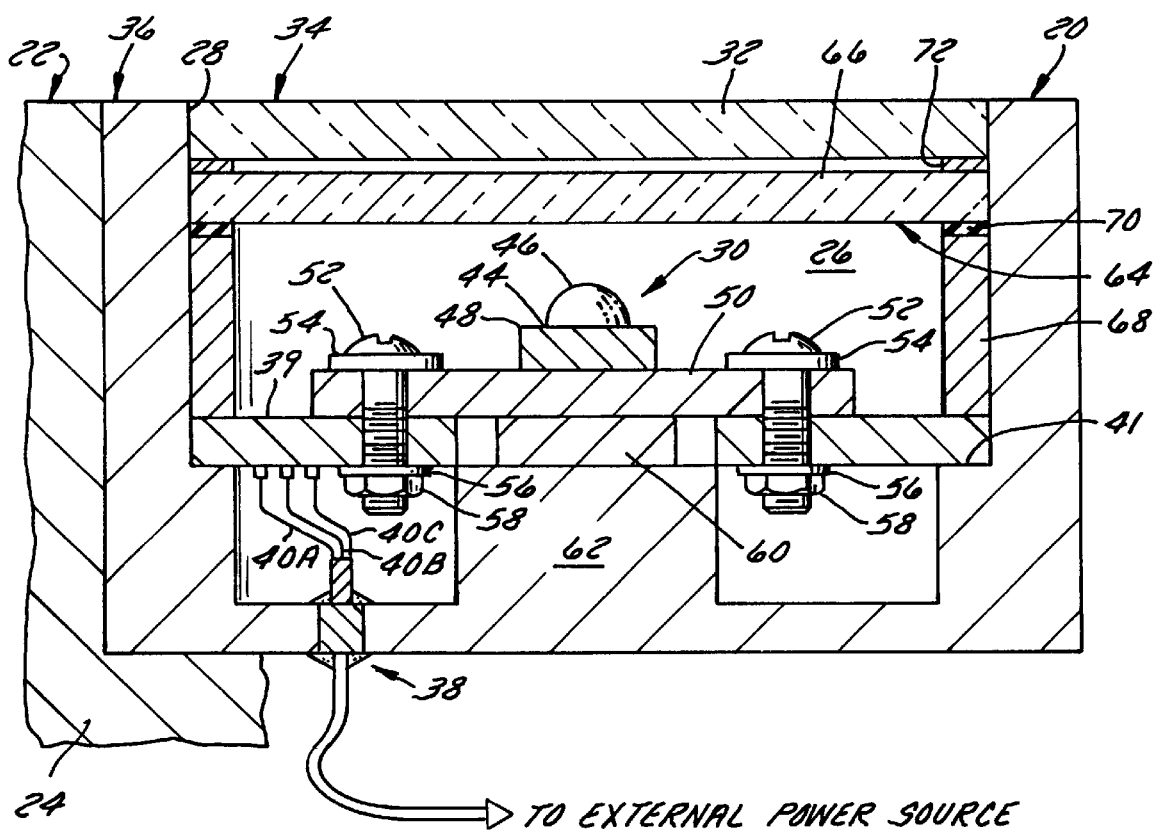
FIG. 1 is a side elevational view, in section, of one preferred embodiment of the flush luminaire of the present invention.

FIG. 1 is a side elevational view, in section, of one preferred embodiment of the flush luminaire of the present invention. The illustrated luminaire includes a one-piece housing 20, made of a commercially-available material which is suitable for outdoor use and that is adapted to withstand extreme temperature and weather conditions, spanning e.g., from arctic cold temperatures to equatorial desert heat as well as from bone dry air to high moisture content air, for the above-mentioned extreme temperature range. In this regard, housing 20 may be made of a suitable durable, impact-resistant, heat-transmissive and inert polymeric material or a suitable metal such as stainless steel or aluminum, with sufficient mass to provide such suitable "heat-sink" properties, as may be desired.

The illustrated luminaire is preferably configured to be substantially flush with the surface 22 of the adjacent environment 24 immediately surrounding the luminaire. In this regard, the adjacent environment 24 may be soil, if the luminaire of the invention is in operation in unimproved areas, or may be concrete or asphalt, if the luminaire of the invention is being used as an airport runway light, for example.

Also, the illustrated housing 20 of the present invention is hollow and defines an internal cavity 26 that is preferably disposed beneath the horizontal surface 22. When viewed from above, the cavity 26, preferably circular, may be any convenient shape such as elliptical, triangular, square, rectangular, pentagonal, hexagonal and so forth. Further in this regard, the housing 20, when thus disposed immediately adjacent environment 24, defines an opening 28 which, in turn, is disposed adjacent the horizontal surface 22.

The luminaire of the present invention further includes a light source 30 disposed within the housing cavity 26, as well as a substantially flat transparent optical window 32 defining a window upper surface 34 that is disposed adjacent the horizontal surface 22 of the environment 24, with the upper surface 36 of the housing 20 being disposed at approximately the same vertical level as the horizontal surface 22 and the window upper surface 34, and being horizontally located therebetween, as is shown in FIG. 1. The optical window 32, preferably made from a scratch-resistant, high impact-resistant, all season, and high light-transmissive commercial grade of glass, thus has an upper surface 34, which is generally co-extensive with the horizontal surface 22 and overlaying the housing opening 28.

Figure 1A:
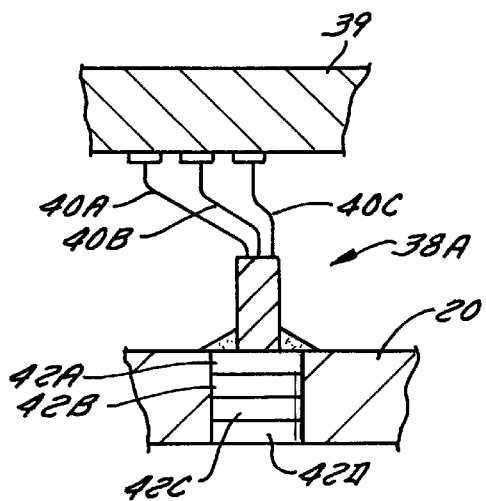
FIG. 1A is a partially fragmented sectional view, which is based on FIG. 1 and presented on an enlarged scale relative thereto.

The luminaire of the present invention further preferably includes a power supply 38 operably connected to the light source 30 by wires 40A, 40B and 40C, the other ends of which wires are operably connected to an external power source, as is illustrated by FIG. 1. The wires 40A, 40B and 40C are disposed through an opening of the housing 20, and are operatively connected to the light source 30 via a conventional printed-circuit power-supply board 39, which is preferably annular in shape. The housing cavity 26, which is preferably circular when viewed from above the housing 20, is preferably so dimensioned relative to the annular printed-circuit power-supply board 39, as to snugly receive the power-supply board 39 within the cavity 26. The housing 20 is further preferably provided with an integrally-formed, internal annular ledge 41 on which the external edge margins of the printed-circuit power-supply board 39 rest. Alternatively, another embodiment of the power supply 38A is conveniently powered by conventional batteries 42A, 42B, 42C and 42D, disposed in the housing 20 as is shown in FIG. 1A.

In accordance with one of the principles of the present invention, one preferred light source 30 is a light-emitting diode (LED) 44 having a light-emitting portion 46 and a heat-generating portion 48. The LED 44 is operably connected to the power supply 38, 38A in a conventional manner via the power-supply board 39.

In the present invention, to remove heat generated by a heat-generating light source 30 such as the LED 44, an effective amount of a heat-transfer surface 50, made of a suitable commercially-available heat-transmissive material, is disposed adjacent, and preferably in contact with, the heat-generating portion 48 of the LED 44, to provide for removal of heat that is generated by the light-emitting diode 44 or other heat-generating light source 30. Further in this regard, a relatively efficient heat conductor, such as copper, may be a preferred material-of-construction for the heat transfer surface 50. A suitable heat-transmissive material will, of course, depend upon the environment-of-use as well as particular thermal conductivity properties that are desired. Such considerations are, however, well within the expertise of those skilled in the art.

The heat-transfer surface 50 may be either permanently or removably affixed to the LED 44. Also, the heat-transfer surface 50 may be permanently adhesively bonded or, in the alternative, may be releasably mounted on the printed-circuit power-supply board 39, in a conventional manner, via commercially-available threaded fasteners 52, spacers 54, washers 56 and nuts 58, as depicted in the illustrated embodiment of FIG. 1.

In the present invention, further to remove heat generated by the heat-generating light source 30 such as the LED 44, the luminaire of the invention preferably includes a temperature-control device 60 such as the thermoelectric module shown in FIG. 1.

Such thermoelectric modules, occasionally referred to as Peltier devices, are generally well known. Such thermoelectric modules, briefly stated, are heat pumps which transfer heat by electric current. A principal utility of the thermoelectric modules is in the cooling of heat-generating microcircuits.

Further in reference to the present invention, the illustrated temperature-control device 60 is disposed within the housing cavity 26 in association with the heat-transfer surface 50 for the purpose of achieving a substantially uniform temperature profile for the heat-generating light source 30 such as the LED 44. The temperature-control device 60 is operatively connected to the power supply board 39 by wires (not shown), for enabling the temperature-control device 60 to be powered by the conventional power supply 38 and/or 38A, as discussed above. Further in this regard, the temperature-control device 60 is mounted atop an integral plateau 62 of the housing 20 which is generally centrally disposed within the cavity 26. Still more particularly, the temperature-control device 60 is spaced adjacent, preferably in surface-contacting association with, the heat-transfer surface 50, for achieving the substantially uniform temperature profile mentioned above.

In operation, the temperature-control device 60 has a "cold" side and a "hot" side. In this regard, the "cold" side of the illustrated temperature-control device 60 is in contact with the heat-transfer surface 50 and the "hot" side is in contact with the plateau 62 of the housing 20. Still further in this regard, those skilled in the art can readily appreciate that the dimensions and geometry of the illustrated plateau 62 may be modified, from what is illustrated, and a sufficient mass selected for the purpose of optimizing the "heat sink" effect of the housing 20, as desired.

Therefore, in accordance with another principle of the present invention, if it is desirable for the heat-generating light source 30 such as the LED 44 to operate across a wide temperature range, those skilled in the art after reviewing this patent specification and associated FIGURES would readily be able to design a power-supply board 39 with suitable necessary circuitry, for enabling the LED 44 to operate in such a temperature range as well as in the extreme climates and weather conditions mentioned above with minimal experimentation. Thus, based upon the performance characteristics of currently-available LEDs, it is our estimate that a useful life of 100,000 hours (over 11 years of continuous service) can be achieved.

In accordance with still another principle of the present invention, the luminaire is "stabilized" and incorporates a "stabilized" light-emitting diode (LED), wherein the term "stabilized" is herein understood to connote stabilized for longevity and stabilized for performance (generated light flux, color and spatial light distribution) and is herein understood to mean designed to operate within a preselected temperature range in the extreme climates and weather conditions mentioned above within given specifications.

The luminaire of the invention also preferably includes an optical element 64 disposed within the housing cavity 26, as is shown in FIG. 1. A particularly preferred optical element 64 is a spatial light distribution transformer light-transmissive prismatic structure 66 (FIG. 1), that is disposed between the light source 30 and the optical window 32, and which is configured to provide optimal light output relative to the horizontal surface 22 in response to spatial light distribution from the light source 30, especially when the light source 30 is the light-emitting diode 44, as discussed above.

The optical element 64, preferably disposed generally parallel to the horizontal surface 22, is spaced above the light source 30 by an annular ring 68 which is preferably dimensioned to fit snugly within the housing cavity 26 and to be mounted on the illustrative printed-circuit power-supply board 39. The height or axial dimension of the annular ring 68, moreover, may be conveniently chosen to optimally space the optical element 64 from the light source 30, as desired. For example, the height or axial dimension of the annular ring 68 is preferably selected to place the optical element 64 at the focal plane of the light source 30, provided the light source 30 has a focal plane. For the light-emitting diode 44, however, the height or axial dimension of the annular ring 68 is preferably selected to place the optical element 64 at a predetermined distance from the LED 44.

To achieve such purposes, a conventional annular spacer or gasket 70 can readily be disposed between the annular ring 68 and the peripheral edge portion of the illustrative prismatic light transformer (PLT) 66, if such is desired. Further in that regard, yet another annular spacer 72 is easily disposed between the transparent optical window 32 and the prismatic light transformer 66, especially for the purpose of bringing the window upper surface 34 substantially to the level of the surface 22 of the environment 24, if such is desired.

Figure 2:
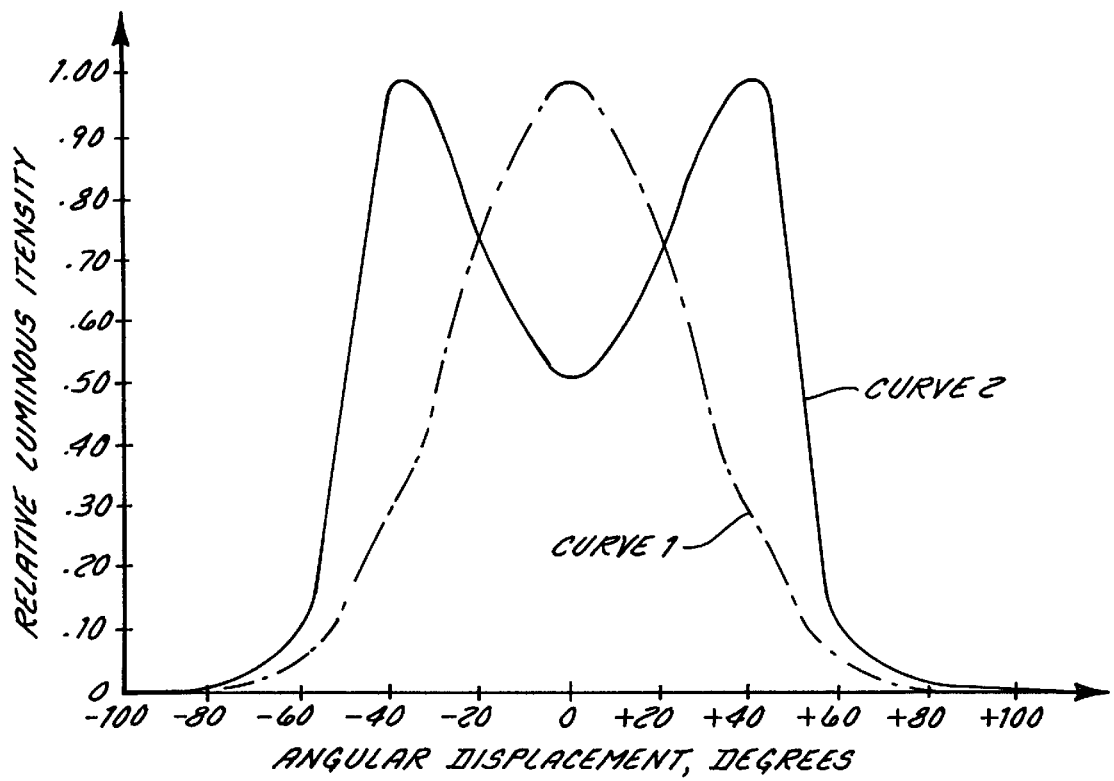
FIG. 2 is a graphical depiction of relative luminous intensity as a function of angular displacement, in degrees, relative to one aspect or feature of the invention.
Figure 3A:
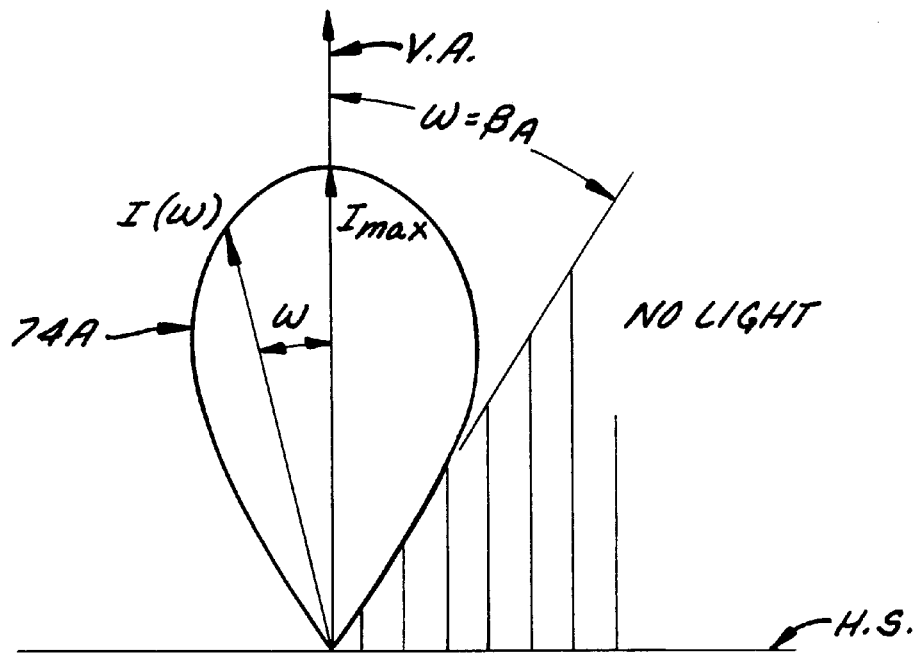
FIG. 3A represents an illustrative three-dimensional light output characteristic of the LED-based embodiment represented by curve 1 in FIG. 2.
Figure 3B:
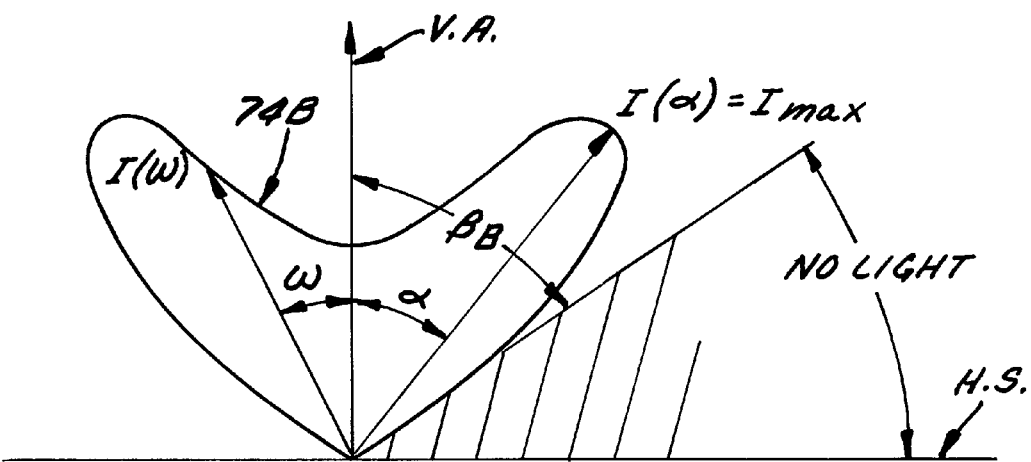
FIG. 3B represents an illustrative three-dimensional light output characteristic of the LED-based embodiment represented by curve 2 in FIG. 2.

Reference is next invited to FIGS. 2, 3A and 3B, which are graphical presentations of relative luminous intensity, shown on the vertical axis, as a function of angular displacement, in degrees, shown on the horizontal axis, relative to still another aspect or feature of the present invention which shall now be discussed.

Those skilled in the art generally know that conventional light sources, such as incandescent lamps and a vast assortment of other so-called "standard" light sources, frequently possess a relative luminous intensity output characteristic as is depicted in profile by curve 1, shown in dashed-and-dotted line. We refer to such a luminous intensity profile as a "main beam" which produces a light output that is generally equally distributed about a central angular displacement region. Certain commercially-available light-emitting diodes, however, may possess a luminous intensity output characteristic with the light output peaking at about ±40° relative to zero degrees angular displacement at the center of the region (optical axis). In this patent specification, such region defines the origin of the optical axis and the zero degrees angular displacement value defines the direction of the optical axis. The resultant luminous intensity output characteristic, accordingly, spreads light output generally further from the central angular displacement region, as is depicted by curve 2, shown in solid line in FIG. 2.

The cross sectional view of the three-dimensional luminous intensity distribution for both light sources with "main beam" and "angular displacement of maximum" are presented in FIGS. 3A and 3B respectively. Each of them is formed by the rotation of envelope I(ω), which presents intensity I as a function of angle ω, about a vertical axis (V.A.), the optical axis, which is disposed perpendicular to a reference horizontal surface (H.S.). In FIG. 3A, the envelope 74A presents a light source having a "main beam" with a maximum light output $I_{max}$ in the direction of the vertical axis (i.e., ω=0), and no visible light from angle (ω=$\beta_A$ to ω=90°.

In FIG. 3B, the envelope 74B, which presents a light source having an angularly displaced maximum, the maximum light output $I_{max}$ is achieved in the direction (ω=α, and no light is visible from the angle ω=$\beta_B$ to the angle ω=90°.

Figure 4A:
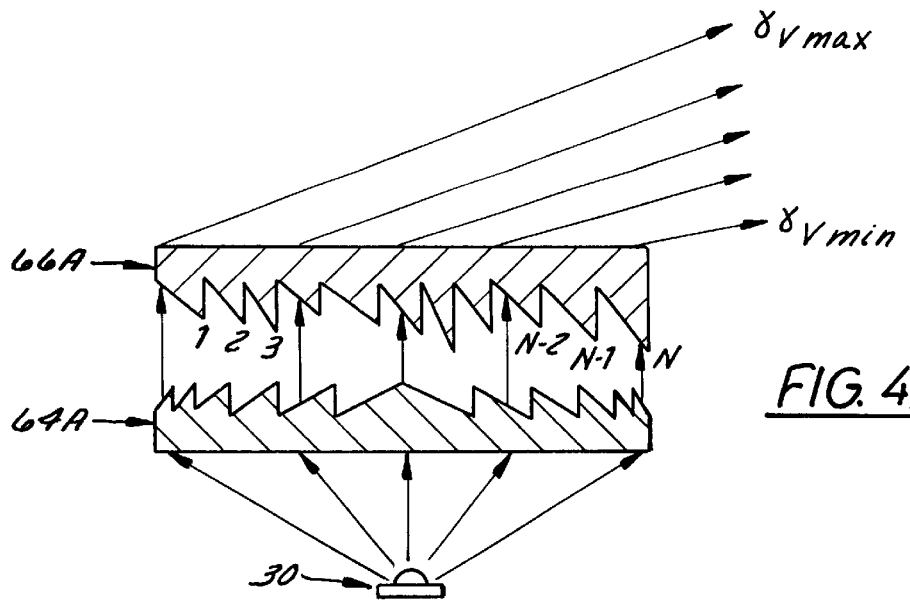
FIG. 4A represents a side view in section of the optical element for the directional flush luminaire design.
Figure 4B:
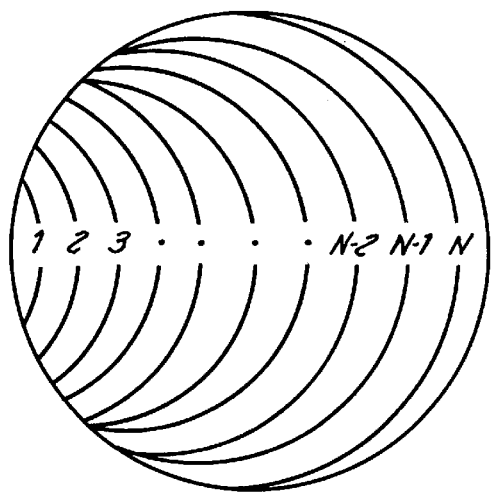
FIG. 4B represents a top view in section of the prismatic light transformer.
Figure 4C:
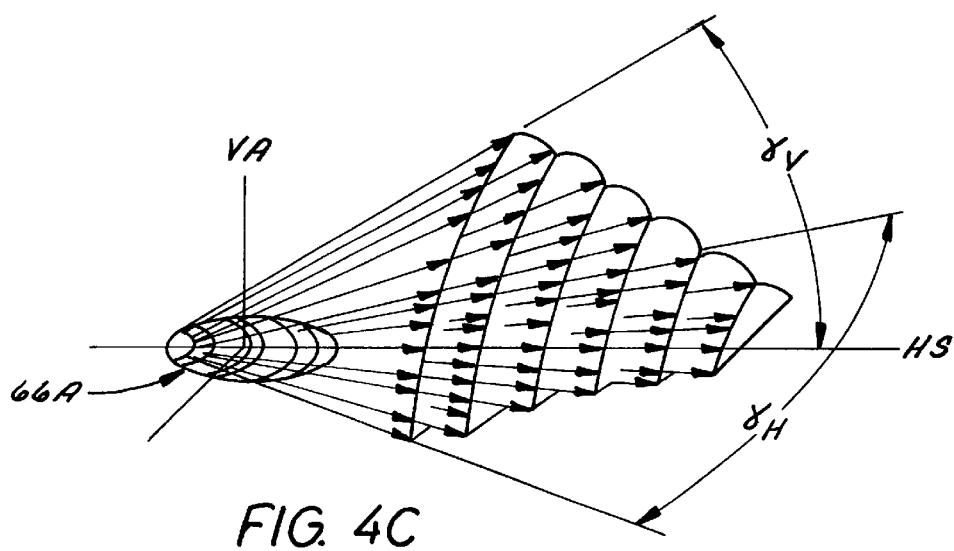
FIG. 4C represents a perspective view of the prismatic light pattern that is emitted by the directional flush luminaire relative to the horizontal surface and the vertical axis.

Reference is next invited to FIGS. 4A, 4B and 4C, described above. To achieve a predetermined and desired directional light distribution pattern, a combination comprising a collimating Fresnel lens 64A and a prismatic light transformer (PLT) 66A is used. In operation, the light emitted by the light source 30 is collimated by the Fresnel lens 64A, and is collected and directed by the PLT 66A.

A PLT, generally represented by a transparent optical element that is circular in shape when viewed from above, comprises a plurality of curved prismatic facets disposed across the PLT surface, as shown in FIGS. 4A and 4B. The angle of inclination of each individual prismatic facet, relative to a reference plane such as the horizontal surface (HS), as well as the facet shape, may readily be calculated based on the spatial light distribution of the light source, the material index of refraction, and the desired outgoing light distribution pattern. The number of facets, "N," and the distance between the facets can be based on the required accuracy.

Figure 5A:
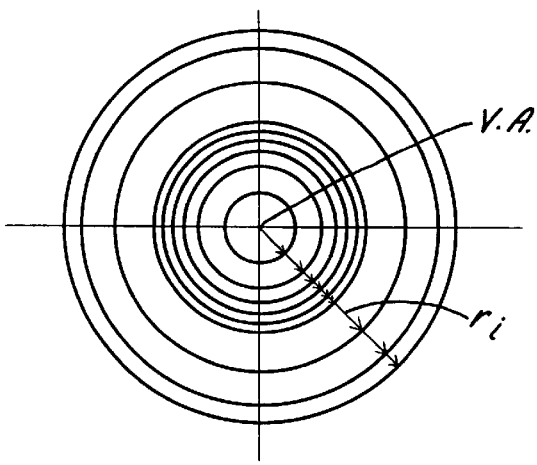
FIG. 5A represents a top view of a CPLT design.
Figure 5B:
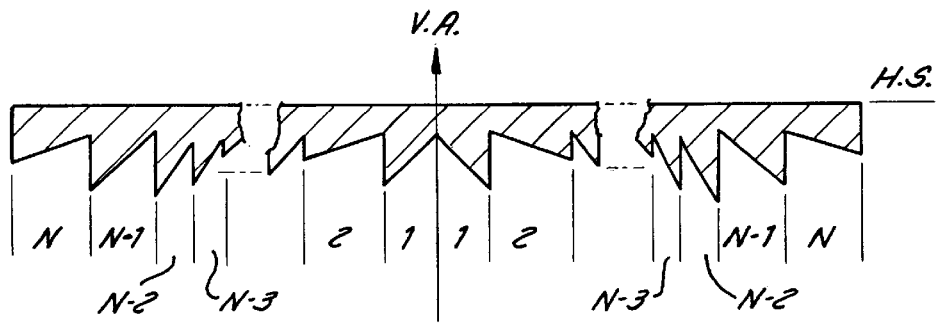
FIG. 5B represents a side view of a CPLT design.

Reference is next invited to FIGS. 5A and 5B, which are graphical presentations of the top view and side view respectively of the Circular Prismatic Light Transformer (CPLT) design. In this regard, the CPLT design disclosed herein is functionally equivalent to the optical element 64, with respect to providing a predetermined omnidirectional light distribution.

A CPLT generally may be a represented by transparent optical element, circular in shape when viewed from above, and consisting of a plurality of concentric prismatic facets. These prismatic facets are each disposed from the center (vertical axis) by a radial value, $r_i$, which can be equal to or different from facet to facet depending on design. The angle of inclination of each individual prismatic facet, as measured by the angle Φ, relative to a reference plane such as horizontal surface (H.S.), can be calculated based on the spatial light distribution of the light source (incident beam), material index of refraction, n, and desired outgoing light pattern (radiant beam). The total number of facets, N, and each radial value, $r_i$, can be determined for a particular design based on required accuracy.

Circular prismatic light transformer (CPLT) design is an iterative procedure based on a given light source, angular intensity distribution (plurality of incident beams), desired outgoing light pattern (plurality of radiant beams) and given index of refraction of CPLT material. As a result of this iterative procedure, the inclination angle $\phi_i$, and radial value, $r_i$, for each prismatic facet are calculated step-by-step from previous facets to subsequent ones. FIG. 5 illustrates a single iteration procedure from facet "i" to facet "i+1." If a light source angular intensity distribution in the direction of incident angle $\omega_i$ corresponding with incident intensity equal to $I_i$, the resulting radiant angle $\omega'_i$ will be:

$$\omega'_i = \omega_i + (n-1)\Phi_i, \quad (1)$$

where n is the index of refraction and $\phi_i$ is the inclination angle for the "$i_{th}$" facet.

The transformation by facet "i" will change the incident ray intensity $I_i$ to the radiant ray intensity $I'_i$ according to the formula, $$I'_i = I_i \frac{\sin\omega_i}{\sin\omega'_i}, \quad (2)$$

where $\omega_i$ is the incident angle and $\omega'_i$ is the radiant angle.

Note that FIG. 5 presents a cross-section of incident and radiant cones of rays with angle of the apex $\omega_i$ and $\omega'_i$ respectively. The total intensity of the radiant beam in the direction of $\omega'_i$ is:

$$I(\omega') = I'_i \cdot \Delta\omega', \quad (3)$$

where the radiant angle increment is:

$$\Delta\omega' = \omega'_{i-1} - \omega'_i, \quad (4)$$

On the other hand, the radiant angle increment $\Delta\omega'$ satisfies the following equation:

$$\Delta\omega' = \Delta\omega + (n-1)\cdot\Delta\phi_i, \quad (5)$$

where $\Delta\omega$ is the incident angle increment (assuming for simplicity equal from step-to-step), and $$\Delta\phi_i = \phi_{i+1} - \phi_i, \quad (6)$$

From Equation (6) an inclination angle of each subsequent facet can be calculated with a chosen constant coefficient, $$k = \frac{I(\omega')}{I_0(\omega')}, \quad (7)$$

where $I_o(\omega')$ is the normalized radiant intensity.

If $\omega_o$ is the restriction angle of the incident beam and $\omega'_o$ is the restriction angle of the radiant beam, k must be chosen as follows:

k must be increased by an increment, $\Delta k$, if the incident angle, $\omega$, will reach the restriction value, $\omega_o$ before the radiant angle, $\omega'$, reaches restriction value, $\omega'_o$.

k must be decreased by increment $\Delta k$ if the radiant angle, $\omega'$, will reach the restriction value, $\omega_o$ before the incident angle, $\omega$, reaches restriction value, $\omega_o$.

In the case where neither $\omega$ or $\omega'$ can reach its respective restriction angle, the discrepancy analysis must sacrifice the light source incident angle $\omega_o$.

Summarizing the above, the optical element feature (FIGS. 5A, 5B and 6) of the present invention is characterized as a circular prismatic light transformer, comprising a plurality of concentric prismatic facets radially disposed about a central optical axis, such as the vertical axis, V.A., preferably with individual radial values relative to predetermined accuracy-of-light criteria. Each of the plural prismatic facets has an individual inclination angle (equation 7) relative to a reference plane (such as horizontal surface, H.S., of FIGS. 5B and 6) disposed perpendicular to the central optical axis. The individual inclination angle for each of the plural prismatic facets is calculated as a function of both actual intensity of an incident cone of light from a light source and a desired intensity of a radiant cone of light in a particular, preselected direction. (See equations 1 through 7, above, with respect to FIGS. 5B and 6.) Light from the light source passes through the circular prismatic light transformer and, as a result, such light from the light source is redirected and redistributed. This, in turn, produces an associated particular, preselected light intensity output envelope. (See, e.g., FIG. 8.)

Figure 6:
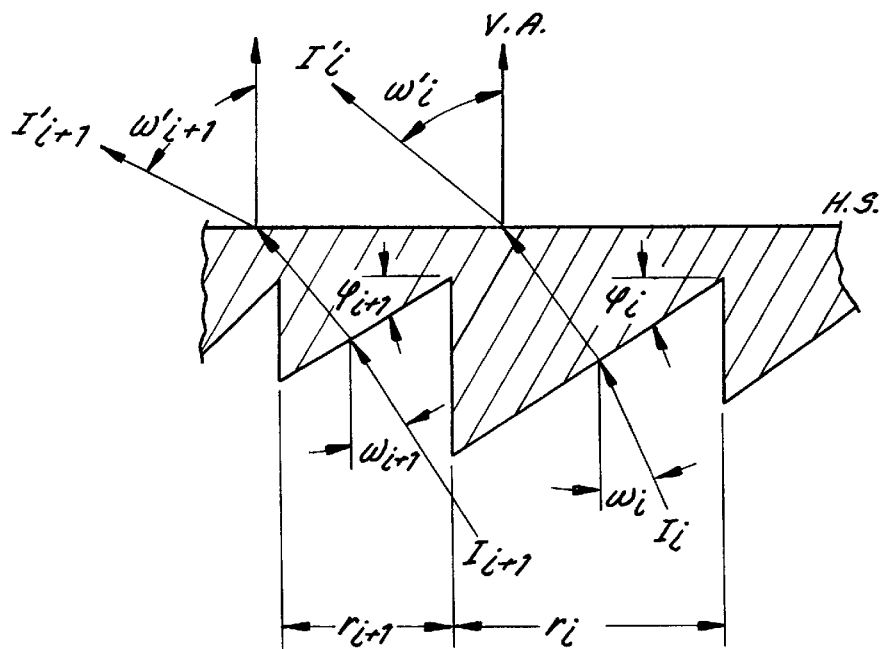
FIG. 6 is an illustrative plot of one single iteration procedure from facet to facet.
Figure 7:
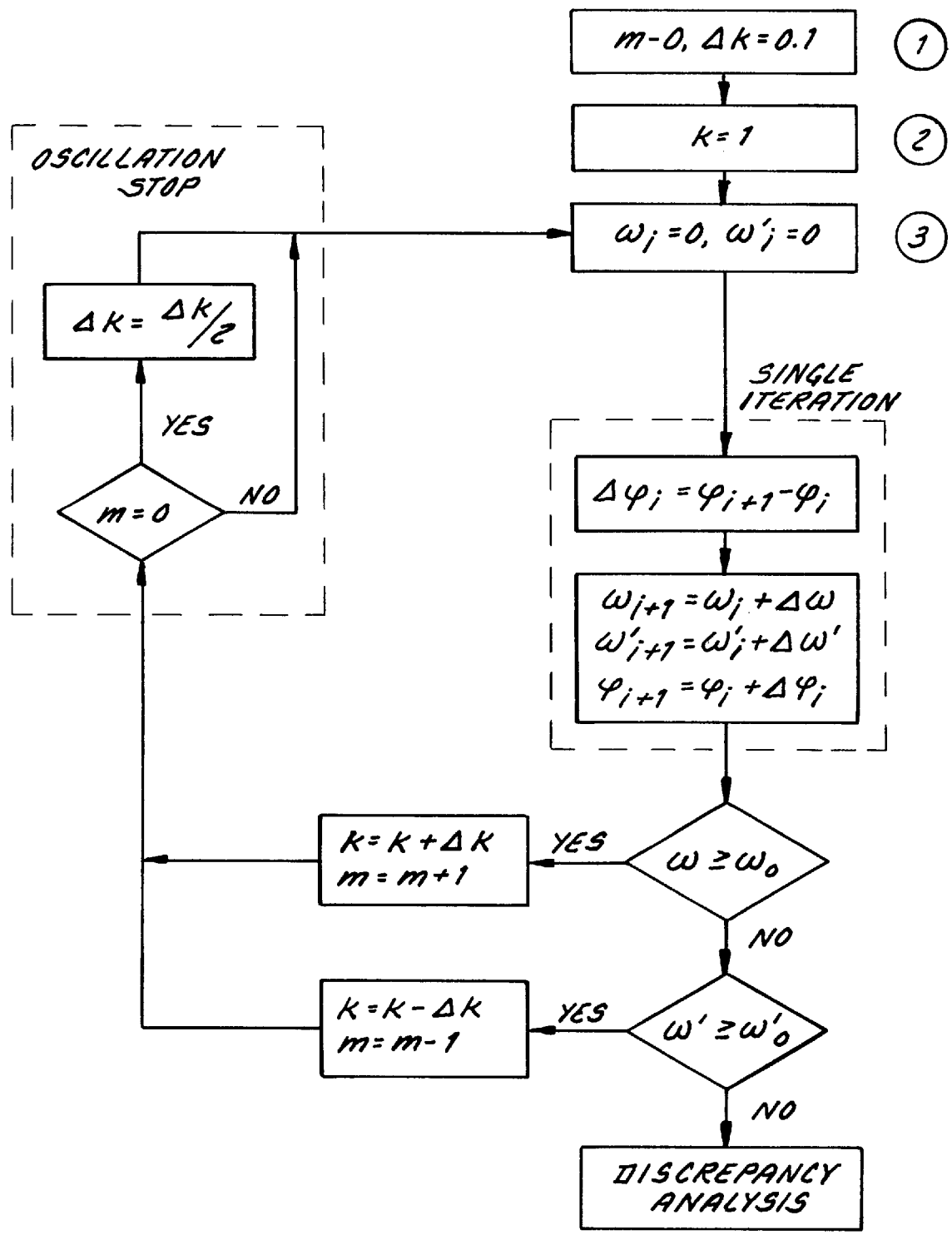
FIG. 7 is a graphical presentation of a flow-chart describing an iterative procedure for the CPLT design.

Referring now to FIG. 6, steps 1–11 are explained here.

Steps 1–3 Setting of Initial Parameters
 oscillation stop sign (m),
 constant coefficient (k),
 incident angle ($\omega_i$),
 radiant angle ($\omega_i'$), and
 facet inclination angle ($\Phi_i$).

Steps 4–5 Iteration Cycle of CPLT Single Prismatic Facet Design
 calculate radiant angle increment $\Delta\omega'$ using Eq (5)
 calculate inclination angle increment $\Delta\Phi_i$ using Eq (6) and given incident angle increment $\Delta\omega$ Steps 6–9 Parameter Adjustments for Next Iteration
 if $\omega \geq \omega_o$ but $\omega' < \omega_o'$ the incident intensity may need to be transformed more "economically" i.e., constant coefficient k must be increased, and oscillation stop sign m must be increased by 1.
 if $\omega < \omega_o$ but $\omega' \geq \omega_o'$ constant coefficient k must be decreased, and oscillation stop sign must be decreased by 1.

Steps 10–11 Oscillation Stop
 if oscillation stop sign m is equal to 0 it means that events in steps 6 and 7 proceed concurrently and coefficient k came back to its original value, which means the oscillation is around optimum.
 to reach optimum, constant coefficient increment $\Delta k$ must be decreased to half of original value.

An example of a CPTL design using the iterative procedure described above and presented in FIG. 6 is shown in Table 1.

TABLE 1

CPTL Design Using Iterative Procedure

| Facet Number, i | Facet Radius (mm) | Facet Inclination Angle, $\phi_i$ (radian) |
|---|---|---|
| 1 | 0.5 | .1171 |
| 2 | 1.0 | .2288 |
| 3 | 1.5 | .2932 |
| 4 | 2.0 | .3521 |
| 5 | 2.5 | .3763 |
| 6 | 3.0 | .3958 |
| 7 | 3.5 | .4104 |
| 8 | 4.0 | .4305 |
| 9 | 4.5 | .4534 |
| 10 | 5.0 | .4755 |
| 11 | 5.5 | .4960 |
| 12 | 6.0 | .5166 |
| 13 | 6.5 | .5358 |
| 14 | 7.0 | .5527 |
| 15 | 7.5 | .5661 |
| 16 | 8.0 | .5747 |
| 17 | 8.5 | .5741 |
| 18 | 9.0 | .5658 |
| 19 | 9.5 | .5510 |
| 20 | 10.0 | .5261 |
| 21 | 10.5 | .4976 |
| 22 | 11.0 | .4678 |
| 23 | 11.5 | .4348 |
| 24 | 12.0 | .4038 |
| 25 | 12.5 | .3748 |
| 26 | 13.0 | .3478 |
| 27 | 13.5 | .3228 |
| 28 | 14.0 | .2999 |
| 29 | 14.5 | .2788 |
| 30 | 15.0 | .2595 |
| 31 | 15.5 | .2418 |
| 32 | 16.0 | .2257 |

This CPTL example has been designed to provide omnidirectional equal light distribution across radiant angles from 90° to 30° using a light source with the incident intensity distribution shown in FIG. 3B. Table 1, above, presents calculated values of inclination angle, $\phi_i$, for a corresponding facet radius, using equal radial values $r_i=0.5$ mm for a 32 facet design.

Figure 8:
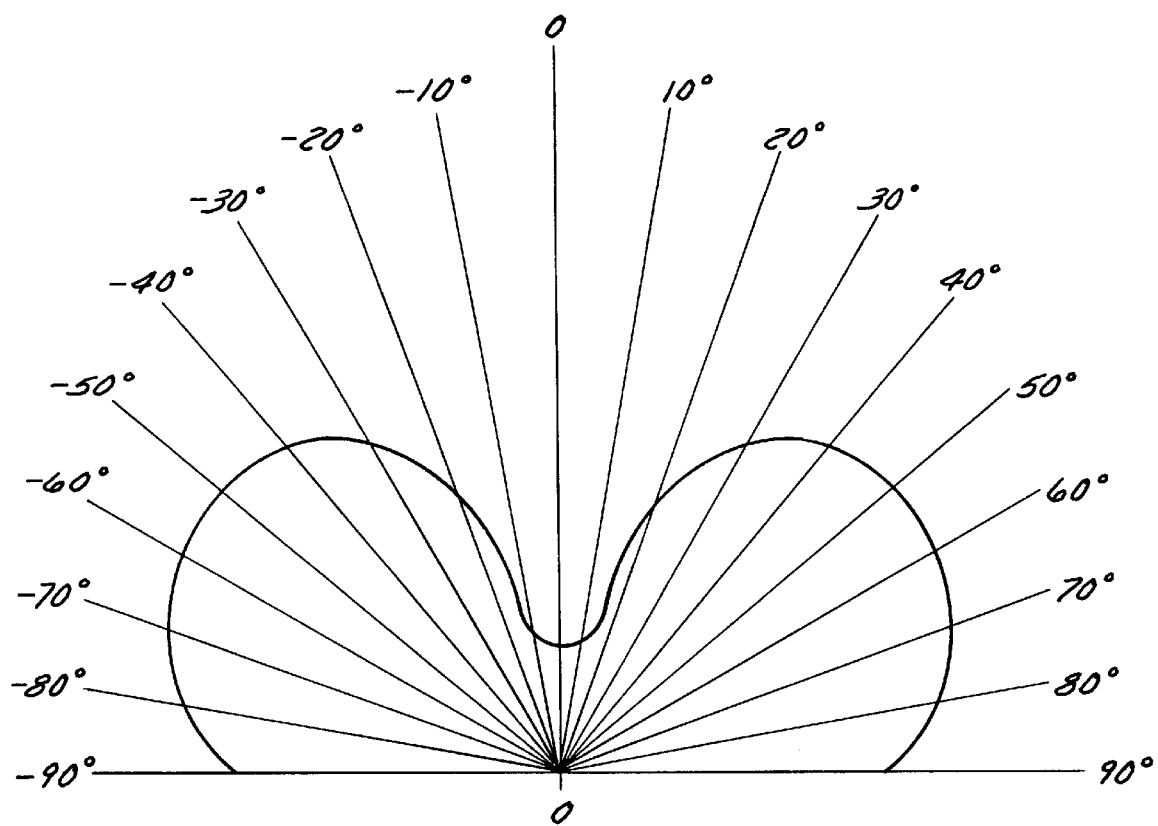
FIG. 8 is a graphical presentation of calculated outgoing intensity for a particular example of the CPLT design.

FIG. 8 is a graphical presentation of a calculated outgoing intensity envelope in the vertical plane relative to the optical axis 0—0 for a flush luminaire, which uses a light source with an intensity distribution envelope shown in FIG. 3B and the CPTL design shown in Table 1. This graph shows that as a result of spatial light distribution transformation by the CPTL, the omnidirectional light pattern emitted by the flush luminaire has almost equal intensity distribution in the vertical angle from 30° to 90° relative to the optical axis (i.e., from 60° elevation to horizontal surface).

What has been illustrated and described herein is a luminaire that is configured and adapted to provide a stable predetermined angular light output distribution pattern of relatively uniform intensity light, characterized by a preselected light intensity output envelope, relative to a reference axis. However, as the luminaire of the present invention has been illustrated and described with reference to several preferred embodiments, it is to be understood that the full scope of the present invention is not to be limited to these embodiments. In particular, and as those skilled in the relevant art can appreciate, functional alternatives will readily become apparent after reviewing this patent specification and enclosed figures. Accordingly, all such functional equivalents, alternatives, and/or modifications are to be considered as forming a part of the present invention insofar as they fall within the spirit and scope of the appended claims.

What is claimed is:

1. A omnidirectional flush luminaire configured to provide a predetermined distribution of light about a horizontal surface comprising:

a housing having an internal cavity disposed beneath the horizontal surface, wherein the housing defines an opening disposed adjacent the horizontal surface;

a substantially flat transparent optical window having a surface, wherein the optical window surface overlays the housing opening and is substantially flush with the horizontal surface;

a light source disposed within the housing cavity, wherein the light source provides a spatial light distribution pattern which defines an optical axis that is disposed substantially perpendicular relative to the optical window surface; and a circular prismatic light transformer disposed within the housing cavity, wherein the circular prismatic light transformer redistributes angular intensity emitted by the light source along preselected angles relative to the horizontal surface, thereby providing a predetermined omnidirectional angular intensity redistribution.

2. The flush luminaire of claim 1, wherein the preselected angles are between 0°–60° inclusive.

3. The flush luminaire of claim 2, wherein the redistributed intensity at each said preselected angle is substantially the same.

4. The flush luminaire of claim 1, wherein the light source is a light-emitting diode.

5. The flush luminaire of claim 4, further comprising an effective amount of a heat-transfer surface, disposed in a heat-transfer relationship with the light-emitting diode, to provide for removal of heat that is generated by the light-emitting diode.

6. The flush luminaire of claim 5, further including a temperature-control device disposed within the housing cavity in association with the heat-transfer surface for achieving a substantially uniform temperature profile for the light-emitting diode to stabilize light-emitting diode performance, specifically the spatial intensity distribution of the light-emitting diode.

7. The flush luminaire of claim 4, wherein the circular prismatic light transformer comprises a collimating Fresnel lens and is disposed between the light source and the optical window, and wherein the transformer is configured to provide optimal light output relative to the horizontal surface in response to light from the light-emitting diode.

8. The flush luminaire of claim 4, wherein the transformer is disposed between the light source and the optical window, wherein the transformer is configured to provide an optimal omnidirectional light output relative to the horizontal surface in response to light from the light emitting diode.

9. The flush luminaire of claim 1, wherein the transformer is formed on the optical window surface.

10. The flush luminaire of claim 1, wherein the light source comprises a plurality of light sources each of which produces a single light beam, wherein the plurality of light beams are integrated such that every light beam is offset from the horizontal surface by substantially the same angle relative to every other light beam.

11. The flush luminaire of claim 1, wherein the substantially flat transparent optical window is disposed substantially parallel to the horizontal surface.

12. The flush luminaire of claim 1, further comprising a power supply disposed within the housing cavity.

13. The luminaire of claim 12, wherein the power supply comprises batteries.

14. The flush luminaire of claim 12, wherein the power supply is operably connected to an external power source.

15. A flush luminaire configured to provide a predetermined omnidirectional distribution of light about a horizontal surface comprising:

a housing having an internal cavity disposed beneath the horizontal surface, wherein the housing defines an opening disposed adjacent the horizontal surface;

a substantially flat transparent optical window having a surface, wherein the optical window surface overlays the housing opening and is substantially flush with the horizontal surface;

a heat-generating light source disposed within the housing cavity, wherein the light source provides a spatial light distribution pattern which defines an optical axis that is disposed substantially perpendicular relative to the optical window surface;

an effective amount of a heat-transfer surface, disposed adjacent the light source in a heat-transfer relationship, to provide for removal of heat that is generated by the light source;

a temperature-control device disposed within the housing cavity adjacent the light source and in association with the heat-transfer surface for achieving a substantially uniform temperature profile for the light source; and a circular prismatic light transformer disposed within the housing cavity, wherein the circular prismatic light transformer redistributes angular intensity emitted by the light source along preselected angles relative to the horizontal surface, thereby providing a predetermined omnidirectional angular intensity redistribution.

16. An optical element characterized as a circular prismatic light transformer, comprising a plurality of concentric prismatic facets radially disposed about a central optical axis, wherein each of the plural prismatic facets has an individual inclination angle relative to a reference plane disposed perpendicular to the central optical axis, wherein said individual inclination angle for each of the plural prismatic facets is calculated as a function of both an actual intensity of an incident cone of light from a light source and a desired intensity of a radiant cone of light in a preselected direction, and wherein light from said light source passes through said circular prismatic light transformer, whereupon said light from said light source is redirected and redistributed, thereby producing a preselected light intensity output envelope.

17. The optical element of claim 16, wherein a plurality of concentric prismatic facets are radially disposed about the central optical axis with individual radial values relative to predetermined accuracy-of-light redistribution criteria.

18. The optical element of claim 16, wherein the plurality of prismatic facets are disposed across an optical element surface in a predetermined pattern to provide directionality.

19. The optical element according to claim 18, wherein the predetermined pattern is an eccentric pattern.

20. The optical element according to claim 18, wherein the predetermined pattern is a parabolic pattern.

21. The optical element according to claim 18, wherein the predetermined pattern is a hyperbolic pattern.

22. The optical element according to claim 18, wherein the predetermined pattern is an arbitrary pattern.

23. A directional flush luminaire configured to provide a predetermined distribution of light about a horizontal surface comprising:

- a housing having an internal cavity disposed beneath the horizontal surface, wherein the housing defines an opening disposed adjacent the horizontal surface;
- a substantially flat transparent optical window having a surface, wherein the optical window surface overlays the housing opening and is substantially flush with the horizontal surface;
- a light source disposed within the housing cavity, wherein the light source provides a spatial light distribution pattern which defines an optical axis that is disposed substantially perpendicular relative to the optical window surface; and
- a circular prismatic light transformer disposed within the housing cavity, wherein the circular prismatic light transformer redistributes angular intensity emitted by the light source along preselected angles relative to the horizontal surface, thereby providing a predetermined directional angular intensity redistribution.

* * * * *